3,116,345
PROCESS FOR PRODUCTION OF BRANCH CHAIN HYDROCARBONS FROM PROPENE
Stephen C. Slaymaker, La Porte, Tex., assignor to Shell Oil Company, New York, N.Y., a corporation of Delaware
No Drawing. Filed June 30, 1961, Ser. No. 120,931
9 Claims. (Cl. 260—683.15)

This invention relates to a process for the catalytic conversion of propene into higher boiling hydrocarbons. More particularly, the process relates to the catalytic conversion of propene into higher boiling branched chain hydrocarbons, especially branched chain paraffin hydrocarbons.

The conversion of normally gaseous hydrocarbons, such as propene, into relatively high boiling high octane gasoline components by means of catalytic processes is well known. Processes which are in commercial use are alkylation and polymerization. In the alkylation process, propene is converted into higher boiling hydrocarbons by alkylating it with isobutane in the presence of a mineral acid catalyst such as concentrated sulfuric acid. The alkylate, paraffinic hydrocarbons which have a high octane rating, is a valuable component in gasoline blending. However, the alkylation process requires isobutane which is usually of limited supply and also is an expensive process.

In the polymerization process, propene is converted in the presence of an acid catalyst into olefinic products such as dimer, trimer, and tetramer. The presence of these products in motor gasoline, in recent years, has been increasingly undesirable because of their high sensitivity and because of air pollution problems. The olefinic products can be converted to the corresponding saturated hydrocarbon by a separate hydrogenation process, usually a catalytic process employing such catalysts as tungsten/nickel/sulfide, cobalt molybdenum on alumina, and the like.

Propene alkylate and polymer (and hydropolymer) are relatively high molecular weight hydrocarbons boiling in the middle and upper end of the gasoline boiling range. However, with the advent of the catalytic reforming process, which converts 200–400° F. naphthas into high octane aromatic gasoline, the refiner now can more readily meet his requirements for large volumes of high octane blending components in the upper portion of the gasoline boiling range. Consequently, increasing attention has been given to the development of processes for the production of high octane low boiling fractions, such as isopentane and isohexane. A process for converting propene into such low boiling isoparaffins is therefore highly desirable.

In copending application, Serial No. 65,896, by Johannes H. Choufoer, Hendrikus de Ruiter, and Dick van Zoonen, propene is converted into isopentane and isohexane by passing propene, in the presence of a hydrogen containing gas at about 400–750° F. over a solid catalyst comprising a hydrogenation component supported on an acidic carrier. A disadvantage of this process is that the conversion of propene to isopentane and isohexane is quite low while there is considerable conversion to propane (Ca 30% w.).

It has now been found that propene can be converted in high yields to low boiling branched hydrocarbons such as isopentane and isohexane by first polymerizing the propene to a polymer having 6 to 15 carbon atoms and then subjecting the polymer to hydroisomerization over a solid catalyst comprising a hydrogenation component supported on an acidic carrier.

The polymerization of propene can be by any suitable process known to the art. Suitable polymerization catalysts are, for example, heteropoly acids (particularly those derived from tungsten, such as silicotungstic acid silica alumina, sulfuric acid, phosphoric acid, and the like.

Polymerization of propene with heteropoly acids, which are usually deposited on a carrier, can take place either in the vapor or liquid phase at a temperature of about 100–400° F. Polymerization with silica alumina takes place under more or less the same conditions as that in which the heteropoly acids are used as catalyst. Polymerization under the influence of sulfuric acid is usually carried out with acid of a concentration of 70% w. and at a pressure of 7–14 atm.

The preferred process for polymerizing propene employs a solid catalyst comprising phosphoric acid on kieselguhr. In this process, the propene is converted into olefinic products containing from 6 to about 12 carbon atoms, such as dimer, trimer, and tetramer. Depending on the products desired, the temperature for this process is usually varied from 375° to 465° F. and the pressure from 42 to 82 atm. The phosphoric acid polymerization process is well known and has been in wide commercial use for many years.

Feed to the polymerization process can consist of substantially pure propene or mixtures of propene and other hydrocarbons, such as propane. Particularly suitable as feed is a $C_3$ fraction recovered from thermal and catalytic cracking of heavy oils.

The polymerization product having a carbon number of 6 to about 15, preferably a carbon number of 6 to about 12, and more especially the product having a carbon number of 9–12, is then passed together with hydrogen over a hydroisomerization catalyst at an elevated temperature of usually between 200° and 900° F. and preferably between about 400° and 750° F.

The conversion takes place at a total pressure of between about 10 and 100 atm. and preferably between about 20 and 60 atm. It is not necessary to use pure hydrogen as hydrogen-containing gases such as are obtained from a catalytic-reforming process are also suitable. The hydrogen partial pressure can vary between wide limits and preferably is between 50 and 95% of the total pressure.

The catalyst used in the hydroisomerization comprises a sulfide of one or more of the metals of the left-hand column of Group VI (chromium, molybdenum, tungsten) and/or a sulfide of one or more of the metals of Group VIII (iron, cobalt, nickel) of the periodic table deposited on a solid acidic support which in itself has catalytic properties. By a solid acidic support it is meant those which, when absorbing butter yellow and still other weaker basic indicators, show a color change of these indicators, indicating the transition to the acid form. Suitable acidic supports for the dual-function catalysts of the invention are compounds of silica and alumina, such as silica-alumina cracking catalyst, compounds of silica and zirconium dioxide, compounds of boron trioxide and alumina, compounds of boron trioxide and silica compounds, compounds of alumina and halogens such as alumina and fluorine, and the like. A support consisting of silica-alumina compounds, and particularly those having a silica content of at least 60% by weight and an alumina content of about 1–40% by weight are preferred.

A component having hydrogenation activity is deposited or distended on the solid acid catalyst component. Suitable components showing hydrogenation activity are sulfides of the metals of the left-hand column of Group VI and/or the metals of Group VIII of the periodic table. Nickel sulfide and/or cobalt sulfide are particularly preferred.

The hydrogenation component functions to promote the hydrogenation of highly unsaturated compounds, such as diolefins, which are present in the feed or formed as an intermediate reaction product, which would tend to deposit on the catalyst as a polymerization product. Rapid deactivation of the isomerization function of the catalyst is prevented in this manner and at the same time, through hydrogenation of diolefins to monoolefins which can then take part in the isomerization reaction, a higher yield of branched hydrocarbons is obtained. The use of component with too strong a hydrogenating action, such as nickel, will result in hydrogenation of the monoolefins before the isomerization component has been able to perform its action.

The amount of metal sulfide applied to the acid catalyst component can vary within the wide limits and is generally in the range of from about 0.5 to about 15% by weight based on the total catalyst. Thus, for example, a catalyst containing silica and alumina and having a silica content of at least 60% by weight (based on the total catalyst) and to which is applied 1 to 10% by weight of nickel sulfide (based on the total catalyst) is an excellent catalyst for use in the process of the invention. The metal sulfide can be applied to the acid catalyst support, for instance silica-alumina cracking catalyst, by any suitable method known per se. For example, the metal sulfide can be applied by impregnating the acid catalyst with a solution of a salt of the corresponding metal, for instance nickel nitrate, followed by drying, calcining and finally sulfiding with hydrogen sulfide or a gas containing hydrogen sulfide.

In the hydroisomerization reaction, propene polymer is converted into a high proportion of isopentane and isohexane. The peak in the distribution of products from the hydroisomerization reaction occurs at about $C_5$ which is in contrast to cracking reactions where the maxima occur at lower carbon numbers. The exact manner in which the conversion reaction proceeds is not known but it is considered to be a complex mechanism involving several conversion reactions.

The degree of saturation of the final product depends on the composition of the catalyst and the reaction conditions used, since the catalyst has the property of wholly or partly converting into saturated hydrocarbons both the olefins present in the starting material and the olefins (mainly branched) formed during the reaction of the propene. In this connection, the reaction conditions, in particular the liquid hourly space velocity, are important. A lower liquid hourly space velocity results in a more drastic hydrogenation of the unconverted olefins as well as any olefins formed. Liquid hourly space velocity of the starting materials to be converted generally varies from 0.5 to 20 barrels of liquid hydrocarbons per hour per barrel of catalyst, although lower or higher space velocities may also be used. If the reaction conditions are such that there is little or no hydrogenation of the reaction product, the product may, if desired, be separately catalytically hydrogenated in the usual manner known per se, for instance by means of a catalyst containing nickel, platinum, or cobalt oxide, molybdenum oxide.

The advantages of the process of the invention have been found to be rather specific to propene. For instance, in polymerizing butene or pentene and then hydroisomerizing the polymerization product, less desirable products are obtained than by hydroisomerizing butene or pentene directly. Thus, in hydroisomerization of isododecene, formed by polymerization of butene, only about 20% w. of isopentane and isohexane, calculated on total yield, are obtained, whereas by direct hydroisomerization of butene, approximately 30% w. of the product consists of isopentane and isohexane.

The following examples further illustrate the invention and its advantages.

EXAMPLE I

A mixture of propene and hydrogen (hydrogen/hydrocarbon molar ratio 6:1) was passed over an acid isomerization catalyst consisting of 83.8% w. of silicon dioxide, 11.4% of aluminum oxide and 4.8% w. of nickel sulfide at a total pressure of about 44 atm., a temperature of 610° F. and a liquid hourly space velocity of 1.

In the first column of Table I the composition of the reaction product obtained after a five-hour experiment is given.

Propene was then polymerized with phosphoric acid on silica gel as catalyst at a temperature of 430° F., a pressure of about 73 atm. and a space velocity of 0.24 gallon of liquid propene per pound of catalyst per hour. The product was distilled and the propene trimer and propene tetramer fractions obtained were hydroisomerized under the same conditions as described hereinbefore for the hydroisomerization of propene.

In the second and third columns of Table I the composition of the reaction products obtained after a five-hour experiment are given.

Propene was then polymerized with the help of a catalyst consisting of silicon dioxide and aluminum oxide at a temperature of 250° F., a pressure of 31 atm. and a space velocity of 2 pounds propene per pound of catalyst per hour. The product consisting of olefins of 6–15 carbon atoms was hydroisomerized under the same conditions as described hereinbefore for the hydroisomerization of propene.

In the fourth column of Table I, the composition of the reaction product after a five-hour experiment is given.

Table I

| Feed | 1 | 2 | 3 | 4 |
|---|---|---|---|---|
| Composition of Product, percent w. on feed | Propene | Propene Trimer | Propene Tetramer | Propene Polymers |
| Methane | 0.1 | 0.1 | 0.2 | 0.2 |
| Ethene and ethane | 0.1 | 0.2 | 0.3 | 0.6 |
| Propene and propane | 31.3 | 5.4 | 6.0 | 2.5 |
| Isobutene and isobutane | 39.8 | 24.9 | 25.0 | 13.4 |
| n-Butenes and n-butanes | 0.4 | 6.1 | 4.7 | 2.5 |
| Isopentanes and isopentenes | 10.5 | 33.1 | 21.7 | 16.0 |
| n-Pentenes and n-pentanes | 0.3 | 1.5 | 0.9 | 0.7 |
| Isohexenes and isohexanes | 13.4 | 13.9 | 16.2 | 16.2 |
| n-Hexenes and n-hexanes | | 0.6 | 0.6 | 0.3 |
| Heptenes and heptanes | | 5.6 | 13.3 | 17.0 |
| Octenes and octanes | | 3.3 | 7.6 | 11.3 |
| Nonenes and nonanes | 4.1 | 5.2 | 2.6 | 13.1 |
| Decenes and decanes | | 0.2 | 0.5 | 3.8 |
| Undecenes and undecanes | | | 0.2 | 0.4 |
| Dodecenes and dodecanes | | | 0.4 | 1.1 |

The product contained mainly saturated hydrocarbons with not more than traces of olefins.

It appears from Table I that, with direct hydroisomerization of propene, 31.3% w. of the product consists of propane and non-converted propene, whereas with hydroisomerization of the products formed by polymerization of propene a maximum of 6.0% w. of propene and propane are present in the product.

Furthermore, with direct hydroisomerization of propene the total amount of branched $C_5$- and $C_6$-hydrocarbons is 23.9% w. calculated on the product, whereas by previous polymerization of propene followed by hydroisomerization a product is obtained with 35 to 47% w. of branched $C_5$- and $C_6$-hydrocarbons.

EXAMPLE II

For comparison a number of experiments were also carried out with isobutene as base material.

A mixture of isobutene and hydrogen (hydrogen/hydrocarbon molar ratio 6:1) was passed over an acid isomerization catalyst consisting of 83.8% w. of silicon dioxide, 11.4% w. of aluminium oxide and 4.8% w. of nickel sulfide at a total pressure of about 44 atm., a temperature of 610° F. and a liquid hourly space velocity of 1.

The first column of Table II gives the composition of the reaction product after a five-hour experiment.

Then isobutene was polymerized with the help of cracking catalyst at a temperature of 265° F., a pressure of about 48 atm., and a space velocity of 5 pounds of isobutene per pound of catalyst per hour.

The isobutene trimer was removed by distillation and hydroisomerized under the same conditions as described hereinbefore for the hydroisomerization of isobutene.

The second column of Table II gives the composition of the reaction product obtained after a five-hour experiment.

*Table II*

| Feed | 1 | 2 |
|---|---|---|
| Composition Final Product (percent w. on feed) | Isobutene | Isobutene Trimer |
| Methane | | 2.4 |
| Ethene and ethane | 5.0 | |
| Propene and propane | | |
| Isobutene and isobutane | 41.3 | 51.5 |
| n-Butenes and n-butane | 17.4 | 2.8 |
| Isopentenes and isopentanes | 22.3 | 13.4 |
| n-Pentenes and n-pentane | 0.5 | 0.2 |
| Isohexenes and isohexanes | 8.3 | 6.2 |
| n-Hexenes and n-hexane | | 0.2 |
| Heptenes and heptanes | 5.2 | 8.2 |
| Octenes and octanes | | 11.2 |
| Nonenes and nonanes | | |
| Decenes and decanes | | 4.0 |
| Undecenes and undecanes | | |
| Dodecenes and dodecanes | | 0.0 |

The data in Table II indicate that with direct hydroisomerization of isobutene 30.6% w. of the product consists of branched $C_5$- and $C_6$-hydrocarbons, whereas with hydroisomerization of isobutene trimer, obtained by polymerization of isobutene, 19.6% w. of the product consists of branched $C_5$- and $C_6$-hydrocarbons. It follows that to obtain branched $C_5$- and $C_6$-hydrocarbons from isobutene it is better to hydroisomerize the feed directly than to form polymers from it first.

EXAMPLE III

Propene polymer was obtained from a commercial polymerization unit using a cracked $C_3$ fraction as feed and using phosphoric acid on kieselguhr as catalyst. This polymer product was then hydroisomerized at different temperatures with a catalyst comprising nickel sulfide on silica-alumina cracking catalyst. Reaction conditions and results are given in Table III.

*Table III*

| | Feed | Product |
|---|---|---|
| Pressure, atm | | 55 | 55 |
| Temperature, °F | | 660 | 720 |
| LHSV | | 1 | 1 |
| H₂/oil | | 6 | 6 |
| Yield, percent w. basis Olefin Feed: | | | |
| C₂ and Lighter | | 0.3 | 1.2 |
| Propane | | 4.1 | 5.9 |
| Isobutane | 0.3 | 21.9 | 21.5 |
| n-Butane | ᵃ 0.3 | 2.7 | 5.2 |
| Isopentane | 1.5 | 25.7 | 27.4 |
| n-Pentane | ᵃ 1.5 | 1.6 | 2.4 |
| C₆ | 7.3 | 10.6 | 18.0 |
| C₇ | 7.7 | 8.8 | 7.8 |
| C₈ | 13.1 | 5.8 | 4.8 |
| C₉ | 56.0 | 10.0 | 7.7 |
| C₁₀⁺ | 14.1 | 2.8 | 1.0 |

ᵃ Includes olefin homologues.

EXAMPLE IV

A silica-zirconia cracking catalyst containing 95 parts of silica to 5 parts of zirconia by weight is impregnated with cobalt nitrate to provide 5% w. cobalt on the catalyst. After drying for two hours at 350° F. and calcining in air for two hours at 925° F., the catalyst is prepared for use in the process of the invention by passing hydrogen sulfide gas over it for about 4 hours at 925° F.

A mixed propene polymer fraction comprising 9% dimers, 38% trimers, 22% tetramers, 19% pentamers, and 12% boiling greater than 500° F., all on a weight basis, was obtained by polymerization of propene over phosphoric acid on silica gel. This rather highly branched olefinic material, when passed over the cobalt sulfide catalyst with hydrogen (hydrogen/oil ratio of approximately 6/1) at a total pressure of 35 atmospheres, a temperature of 575° F., and a liquid hourly space velocity of 1.5, is converted to isopentane and isohexane in high yield and to a lesser yield of other branched chain paraffins in the gasoline boiling range.

I claim as my invention:

1. A process for the conversion of propene to higher boiling branched chain hydrocarbons which comprises polymerizing the propene to a polymer having 6 to 15 carbon atoms per molecule and contacting the polymer in the presence of hydrogen at a temperature of about 200° to about 900° F. and a pressure of about 10 atmospheres to about 100 atmospheres with a solid acidic catalyst support on which is deposited a sulfide of a metal selected from the group consisting of chromium, molybdenum, tungsten, iron, cobalt, nickel, and mixtures thereof, and recovering a product having a high proportion of $C_5$ to $C_6$ isoparaffins.

2. A process according to claim 1 wherein the propene is polymerized with a catalyst comprising phosphoric acid on a solid carrier.

3. A process according to claim 1 wherein propene is polymerized with a catalyst comprising silica-alumina.

4. A process for the conversion of propene to higher boiling branched chain hydrocarbons which comprises polymerizing propene with an acidic polymerization catalyst to a polymer having 6 to 15 carbon atoms per molecule, and contacting the polymer in the presence of hydrogen at a temperature of about 400° and 750° F., a pressure of about 10 atmospheres to about 100 atmospheres, and a liquid hourly space velocity of from about 0.5 to about 20, with a solid acidic cracking catalyst on which is deposited a sulfide of a metal selected from the group consisting of chromium, molybdenum, tungsten, iron, cobalt, nickel, and mixtures thereof, and recovering a product having a high proportion of $C_5$ to $C_6$ isoparaffins.

5. A process according to claim 4 wherein the hydrogen partial pressure is at least 50% of the total pressure and the metal sulfide is deposited on the acidic cracking catalyst in an amount from about 0.5% to about 15%, based on the weight of the final catalyst.

6. A process according to claim 5 wherein the acidic cracking catalyst is silica-alumina having at least 60% by weight silica.

7. A process for the conversion of propene to higher boiling branched chain hydrocarbons which comprises polymerizing propene at a temperature of from 375° to about 465° F. and a pressure of from about 42 to 82 atmospheres with a catalyst comprising phosphoric acid on kieselguhr, recovering a polymer having from 6 to 15 carbon atoms per molecule, contacting the polymer in the presence of hydrogen at a temperature of about 400° to about 750° F., a pressure of about 20 to about 60 atmospheres, the hydrogen partial pressure being at least 50% of the total pressure, and a liquid hourly space velocity of from about 0.5 to about 20, with a catalyst comprising from about 0.5 to about 15%, based on the weight of the final catalyst, of nickel sulfide supported on silica-alumina having at least 60% by weight silica and recovering a product having a high proportion of $C_5$ to $C_6$ isoparaffins.

8. A process for the conversion of propene to higher boiling branched chain paraffins which comprises polymerizing propene to a polymer having 6 to 15 carbon atoms per molecule, and contacting the polymer in the presence of hydrogen at a temperature of about 200° to about 900° F. and a pressure of about 10 to 100 atmospheres with a catalyst comprising nickel sulfide deposited on a solid acidic catalyst support and recovering a product having a high proportion of $C_5$ to $C_6$ isoparaffins.

9. A process for the conversion of propene to higher boiling branched chain paraffins which comprises polymerizing propene to a polymer having 6 to 15 carbon atoms per molecule, and contacting the polymer in the presence of hydrogen at a temperature of about 200° to 900° F. and a pressure of about 10 to 100 atmospheres with a catalyst comprising from about 0.5% to 15% based on the weight of the final catalyst of nickel sulfide supported on silica-alumina having at least 60% by weight silica and recovering a product having a high proportion of $C_5$ to $C_6$ isoparaffins.

References Cited in the file of this patent

UNITED STATES PATENTS

| | | |
|---|---|---|
| 2,216,372 | Layman et al. | Oct. 1, 1940 |
| 2,342,074 | Deanesly et al. | Feb. 15, 1944 |
| 2,635,081 | Mills et al. | Apr. 14, 1953 |
| 2,736,689 | Stuart | Feb. 28, 1956 |
| 2,825,721 | Hogan | Mar. 4, 1958 |
| 3,003,009 | Gurd et al. | Oct. 3, 1961 |
| 3,005,033 | Engelbrecht et al. | Oct. 17, 1961 |